2 Sheets--Sheet 1.

B. HOLLY.

System of Water-Supply for Cities.

No. 5,133. Reissued Nov. 5, 1872.

*Witnesses.*
R. Campbell
J. N. Campbell

*Inventor.*
B. Holly
by
Morris, Kenrick & Lawrence.

AM. PHOTO-LITHOGRAPHIC CO. N.Y. (OSBORNE'S PROCESS.)

2 Sheets--Sheet 2.

B. HOLLY.

System of Water-Supply for Cities.

No. 5,133. Reissued Nov. 5, 1872.

*Witnesses.*

R. V. Campbell

Jas. T. Campbell

*Inventor.*

B. Holly by

Mason, Fenwick & Lawrence

A.M. PHOTO-LITHOGRAPHIC CO. N.Y. (OSBORNE'S PROCESS.)

UNITED STATES PATENT OFFICE.

BIRDSILL HOLLY, OF LOCKPORT, NEW YORK.

IMPROVEMENT IN SYSTEMS OF WATER-SUPPLY FOR CITIES.

Specification forming part of Letters Patent No. 94,746, dated September 14, 1869; reissue No. 4,373, dated May 9, 1871; reissue No. 5,133, dated November 5, 1872.

*To all whom it may concern:*

Be it known that I, BIRDSILL HOLLY, of Lockport, in the county of Niagara and State of New York, have invented certain Improvements in a new System of Water-Works for Supplying Cities and Towns with Water; and I do hereby declare the following to be a full and exact description thereof, reference being had to the accompanying drawing making part of this specification, in which—

Figure 1:
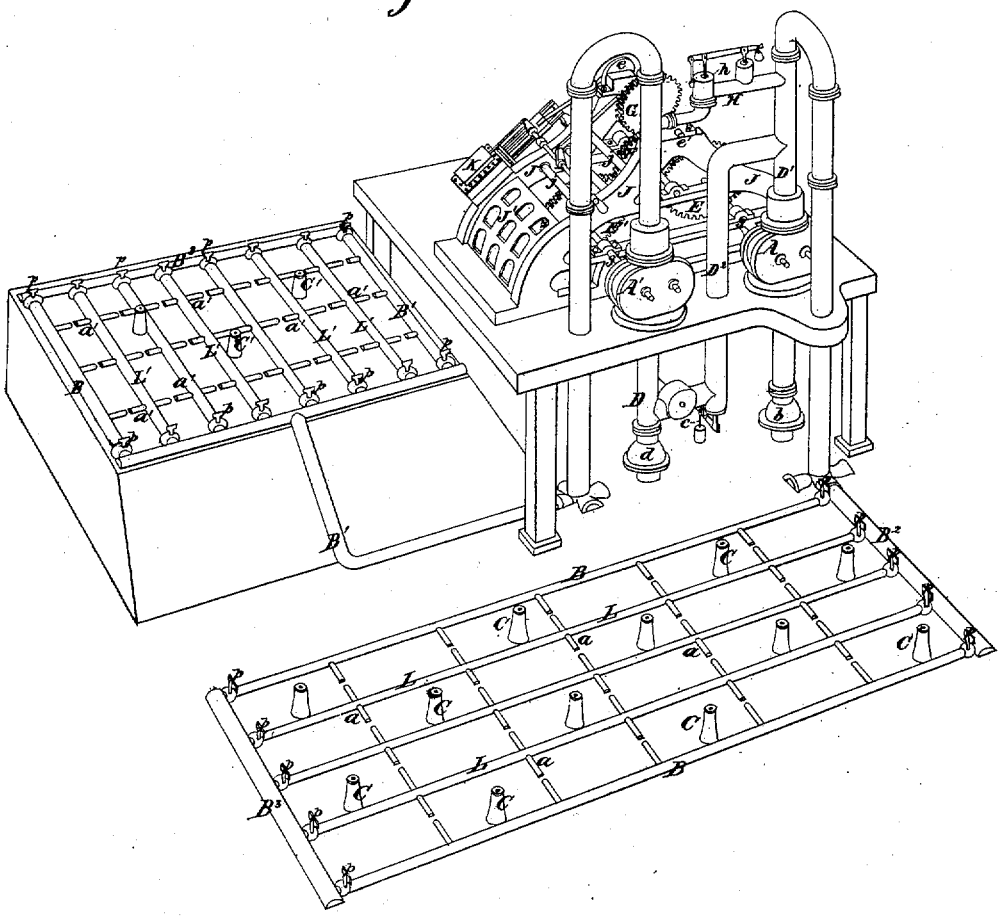
Figure 2:
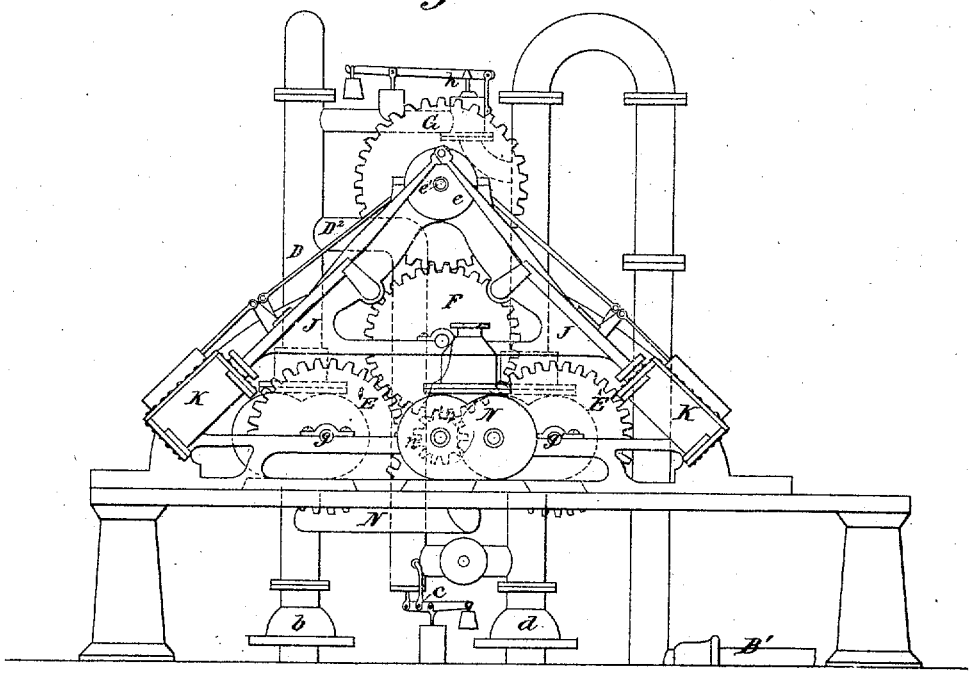
Figure 3:
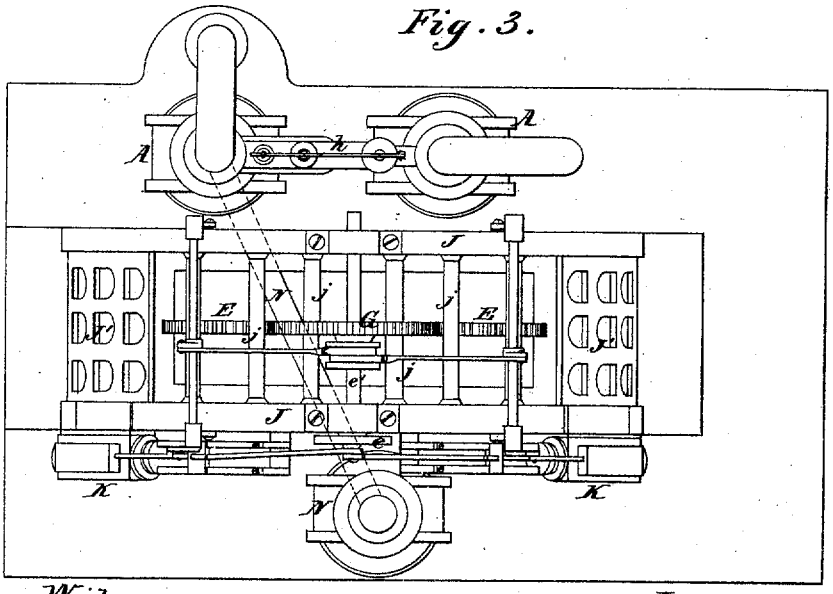

Figure 1, Sheet 1, is a perspective view illustrating my system of supplying cities and towns with water, embracing my said improvements; Fig. 2, Sheet 2, is an elevation of the pumping-engines; and Fig. 3, Sheet 2, is a plan view of the same.

The object of the first of my improvement, hereinafter to be described, is to furnish water for different levels in such a way as to supply the higher level in a city without overstraining the mains and pipes in a lower level; and that of the second of my said improvements is to cause smaller mains to be successfully used as a substitute for larger, and also to provide for the more convenient cutting off of the flow of water in any particular street without interrupting it in others.

In the accompanying drawing, A A′ represent two forcing-pumps, placed at the source from which water is to be derived for supplying the city. B $B^1$ are water-pipes leading along the streets and avenues of the city, and furnishing a convenient opportunity for its distribution along the cross-streets by means of the distributing-pipes *a a′*. C C represent the hydrants or fire-plugs, placed at convenient distances, so that by means of hose attached to each water may be supplied at any point for the extinguishment of fires. Where water is to be raised to considerable elevations, it is often important to so combine one pump with another that there shall be a pressure behind one pump to aid in overcoming the pressure in front of it; and where a portion of the mains is upon a much higher level than another portion, the pump which supplies the lower level may be made to supply this pressure from behind to the pump which is to furnish water for the higher level, as will now be explained.

The pump A is intended for supplying the mains B which lead to the lower level, and the pump A′ is designed for supplying those mains $B^1$ which lead to the higher level, as shown in Fig. 1. Let it be supposed that the pump A supplies the lower mains B, which consume nine-tenths of the water used in the city, while one-tenth will have to be raised to the height of two hundred and twenty-five feet, which will require an additional pressure of about one hundred pounds to the inch. Now, if it were required to raise all the water two hundred and twenty-five feet higher than would be needed for the lower level, (which would be the case if the reservoir plan were used) it would double the cost of pumping, besides causing great strain on all the pumps when working under that pressure. In order to raise that one-tenth to the additional height of two hundred and twenty-five feet without increasing the pressure on all the working parts of the pump A, I attach the suction-pipe D of the pump A′ to the discharge-pipe $D^1$ of the pump A by means of the connecting-pipe $D^2$. It will be seen that the power which supplies the lower mains will carry the water part of the way up to the higher level. All the duty which the pump A′ has to perform is to apply an additional pressure of one hundred pounds to the inch in order to place the mains in the upper level under the same pressure as exists in those of the lower level. The power exerted by the pump A′ is therefore a constant quantity. When a fire breaks out on either the higher or the lower level a fire-pressure communicated to the lower mains will be at once transmitted through the pump A′ to the mains of the upper level, and the water will rise to the same height above each of the two levels, respectively, at the same moment, either for the extinction of fires or for any other purpose. The upper level is thus supplied without exerting any needless pressure upon the mains in the lower level, and, as has been observed, with a great saving of power.

The suction-pipe of the pump A′ may be made to communicate directly with the pumping-well through the pipe D, and also with the discharge-pipe $D^1$ of the pump A through the pipe $D^2$, so as to take water either from said well or from said discharge-pipe. The suction-pipe D has a foot-valve, *d*, applied to it, to prevent the escape of water from the pump A′ when it is being supplied from the pump A. A safety-valve, *c*, is applied to the pipe D, and a safety-valve, *h*, is applied to the pipe H, which forms a communication between the discharge-pipes of the two pumps A A′. When this safety-valve opens the discharge is from the pipes which connect with the higher level into those which connect with the lower, and thus preventing a waste of power.

By the arrangement of street-pipes shown in Fig. 1, I am enabled to dispense with the large and expensive mains hitherto used in such cases, and to substitute a number of small parallel mains in their stead. Under this arrangement the water is taken from the pumps and large mains until it enters the pipe B, (see lower grade of pipes, Fig. 1,) when, instead of passing on perhaps for many miles through a single street, the water is carried off by branch pipes L, each of which supplies its respective street with water, and all terminating in a pipe, $B^3$. Each one of the parallel pipes is provided at its opposite ends with valves *p*, by the closing of which the water will be cut off so that repairs can be made anywhere on that line without interfering with the current of water on any other line of pipes.

In the drawing I have shown a system of mechanism for operating the pumps; but while I shall presently designate the same by letters of reference, I do not wish to be understood as claiming or confining the invention here claimed to such contrivances.

J represents a double-ogee frame, which is strengthened by the webbing J′ J′ and stretchers *j j*, and adapted for supporting upon one side of it two quarter-crank engines. The piston-rods of these engines are both connected to a wrist-pin on a crank-plate, *e*, the shaft *e′* of which carries a spur-wheel, G, and also the eccentric to which the slide-valve rods of the engines are applied. The spur-wheel G is arranged above, and engages with a spur-wheel, F, which latter is arranged above and engages with a pinion, *n*, shown in dotted lines, Fig. 2, which is keyed on the shaft of a rotary engine, N, and which may be thrown in and out of gear at pleasure. On opposite sides of the pinion *n*, and keyed on the shafts *g g′* of the force-pumps A A′, are spur-wheels E E′, either one or both of which it is proposed to engage with or disengage from the spur-wheel F at pleasure by means of suitable shifting-clutches. Each of these spur-wheels E E′ moves a pump or set of pumps, one or both of which are intended for use on all ordinary occasions.

It will be seen that either one or both of these pumps can be operated at pleasure by shifting the wheels E E′ on the shafts *g g′*; also, that the power of the rotary engine N can be brought into requisition at pleasure.

What I claim as new, and desire to secure by Letters Patent, is—

1. In the above-described apparatus, the use of an auxiliary pump, A′, in combination with a connecting-pipe, $D^2$, by which water may be raised to different levels in such a way that the pressure in the mains in the higher level may be kept equal to those on the lower, substantially as described.

2. I claim the use of a main, B, with smaller branches L L running through the several streets and terminating in a larger main, $B^3$, in combination with the valves *p p*, substantially as and for the purpose above shown.

BIRDSILL HOLLY.

Witnesses:
T. T. FLAGLER,
JAMES JACKSON, Jr.